United States Patent
McFadyen et al.

(10) Patent No.: US 11,528,897 B1
(45) Date of Patent: Dec. 20, 2022

(54) TENSION MEASURING SYSTEM THAT DETERMINE TENSION ON A FISHING LINE

(71) Applicant: BlueBite, Rancho Cordova, CA (US)

(72) Inventors: Alexander T McFadyen, Rancho Cordova, CA (US); Siyi Guo, Rancho Cordova, CA (US); Scott A Lewis, Rancho Cordova, CA (US); Nathan P Ross, Rancho Cordova, CA (US)

(73) Assignee: BlueBite, Rancho Cordova, CA (US)

( * ) Notice: Subject to any disclaimer, the term of this patent is extended or adjusted under 35 U.S.C. 154(b) by 829 days.

(21) Appl. No.: 16/446,508

(22) Filed: Jun. 19, 2019

(51) Int. Cl.
*G01L 5/10* (2020.01)
*A01K 97/12* (2006.01)

(52) U.S. Cl.
CPC .............. *A01K 97/125* (2013.01); *G01L 5/10* (2013.01)

(58) Field of Classification Search
CPC ...... G01L 5/00; G01G 21/18–20; G01G 3/08; A01K 97/125
See application file for complete search history.

(56) References Cited

U.S. PATENT DOCUMENTS

| | | | | |
|---|---|---|---|---|
| 4,519,158 A | * | 5/1985 | Kirk | A01K 97/125 43/17 |
| 4,541,195 A | * | 9/1985 | Delaney | A01K 87/007 320/DIG. 15 |
| 4,650,161 A | * | 3/1987 | Kaneko | A01K 89/027 242/246 |
| 4,702,431 A | * | 10/1987 | Kaneko | G01L 5/0057 242/246 |
| 5,479,831 A | * | 1/1996 | Hirose | A01K 89/015 73/862.474 |
| 5,639,038 A | * | 6/1997 | Hirose | G01L 5/04 242/223 |
| 6,370,971 B1 | * | 4/2002 | Olson | G01L 5/108 73/862.634 |
| 6,417,466 B2 | * | 7/2002 | Gross | G01G 3/12 73/862.632 |
| 6,758,006 B1 | * | 7/2004 | Walls | A01K 97/00 377/5 |
| 7,161,872 B2 | * | 1/2007 | Kuriyama | A01K 89/00 367/111 |

(Continued)

OTHER PUBLICATIONS

Texas Instruments, 2.4-GHz Bluetooth® low energy System-on-Chip, Jun. 2013.

(Continued)

*Primary Examiner* — Tran M. Tran
(74) *Attorney, Agent, or Firm* — Law Office Of Michael O'brien; Michael O'Brien

(57) ABSTRACT

A tension measuring system is configured to determine tension on a fishing line. The tension measuring system includes a scale, joined between a rod and a reel. The reel is joined to the fishing line. The scale further includes a scale housing is rigidly attached to the rod. An internal housing is rigidly attached to the scale housing and connected to the reel with lubricant and ball bearings. A planar beam load cell is joined to the scale housing and the reel; wherein the tension on the fishing line causes deformation of the planar beam load cell. A microcontroller is electrically coupled to the planar beam load cell, a power management controller, and a display. The microcontroller uses planar beam load cell deformation to determine tension on the fishing line.

13 Claims, 8 Drawing Sheets

(56) References Cited

U.S. PATENT DOCUMENTS

| | | | | |
|---|---|---|---|---|
| 7,225,102 B2* | 5/2007 | Stiner | A01K 97/00 | |
| | | | 702/173 | |
| 7,318,295 B2* | 1/2008 | Pekin | A01K 97/125 | |
| | | | 43/17 | |
| 7,322,253 B2* | 1/2008 | Owens | A01K 87/007 | |
| | | | 43/17 | |
| 7,467,062 B2* | 12/2008 | Stiner | G01G 19/60 | |
| | | | 702/173 | |
| 7,523,882 B2* | 4/2009 | Priednieks | A01K 89/0108 | |
| | | | 242/231 | |
| 7,775,470 B2* | 8/2010 | Konishi | A01K 89/0178 | |
| | | | 242/223 | |
| 7,779,573 B2* | 8/2010 | Pekin | A01K 87/06 | |
| | | | 43/17 | |
| 7,861,454 B2* | 1/2011 | Pekin | A01K 97/00 | |
| | | | 43/16 | |
| 8,033,045 B2* | 10/2011 | Pekin | G01N 23/20 | |
| | | | 43/17 | |
| 8,474,331 B2* | 7/2013 | Pekin | A01K 87/007 | |
| | | | 73/862.471 | |
| 8,516,738 B2* | 8/2013 | Pekin | A01K 89/00 | |
| | | | 43/17 | |
| 8,648,267 B2* | 2/2014 | Honda | G01G 21/244 | |
| | | | 177/DIG. 9 | |
| 9,002,663 B2* | 4/2015 | Rayor | A01K 97/00 | |
| | | | 702/42 | |
| 9,103,735 B1* | 8/2015 | Lopez | A01K 89/0111 | |
| 9,284,171 B2* | 3/2016 | Ouvrard | B66D 3/18 | |
| 9,609,856 B1* | 4/2017 | Little | A01K 87/00 | |
| 10,004,213 B2* | 6/2018 | Britz | A01K 87/08 | |
| 10,159,232 B2* | 12/2018 | Worley, III | A01K 87/007 | |
| 10,390,523 B1* | 8/2019 | Polston | A01K 97/00 | |
| 2004/0007396 A1 | 1/2004 | Muller et al. | | |
| 2006/0137476 A1* | 6/2006 | Bull | G01L 5/107 | |
| | | | 73/862.393 | |
| 2007/0045010 A1 | 3/2007 | Kasperek | | |
| 2007/0209843 A1 | 9/2007 | Hannon | | |
| 2010/0018783 A1 | 1/2010 | Thompson | | |
| 2010/0181119 A1 | 7/2010 | Saigh et al. | | |
| 2011/0290569 A1 | 12/2011 | Turner | | |
| 2014/0063180 A1 | 3/2014 | Sharma | | |
| 2015/0294641 A1 | 10/2015 | Jones | | |
| 2019/0101435 A1 | 4/2019 | Eide | | |

OTHER PUBLICATIONS

Nordic Semiconductor, nRF8001 Single-chip Bluetooth® low energy solution Product Specification 1.3, Mar. 12, 2015.

NPX Semiconductors, 4K Microwire Compatible Serial EEPROM, 2017.

NPX Semiconductors, MMA8451Q, 3-axis, 14-bit/8-bit digital accelerometer, Feb. 2017.

* cited by examiner

US 11,528,897 B1

TENSION MEASURING SYSTEM THAT DETERMINE TENSION ON A FISHING LINE

BACKGROUND

The embodiments herein relate generally to equipment used to catch fish.

Prior to embodiments of the disclosed invention, there was no precise way to determine tension on a fishing line. Embodiments of the disclosed invention solve this problem.

SUMMARY

A tension measuring system is configured to determine tension on a fishing line. The tension measuring system comprises a scale, joined between a rod and a reel. The reel is joined to the fishing line. The scale further comprises a scale housing that is rigidly attached to the rod. An internal housing is rigidly attached to the scale housing and connected to the reel with lubricant and ball bearings. A planar beam load cell is joined to the scale housing and the reel. The tension on the fishing line causes deformation of the planar beam load cell. A microcontroller is electrically coupled to the planar beam load cell, a power management controller, and a display.

The microcontroller is programmed with instructions to provide electrical power from a battery to the microcontroller with the power management controller. Then, determine the deformation of the planar beam load cell. After that, convert the deformation of the planar beam load cell into a tension force. Following that, communicate the tension force to the display. Then, display a readout of the tension on the display.

In some embodiments, a zero button is attached to the scale housing and electrically coupled to the microcontroller. The microcontroller is further programmed with instructions to determine an initial amount of deformation in the planar beam load cell when the zero button is pressed. Then, recalibrate a planar beam load cell setting such that the initial amount of deformation correlates to zero tension.

In some embodiments, a power button is attached to the scale housing, and electrically coupled to the microcontroller. The microcontroller is further programmed with instructions to determine that power button is pressed. Then, transfer electrical power from the battery to the display. After that, display the read out of the tension on the display.

In some embodiments, an accelerometer is attached to the scale housing and electrically coupled to the power management controller. The power management controller is further programmed with instructions to detect movement of the accelerometer. Then, transfer electrical power from the battery to the microcontroller.

In some embodiments, a three bank electrically erasable programmable read-only memory is electrically coupled to microcontroller, and configured to store the instructions for the microcontroller.

In some embodiments, a Bluetooth communication circuit is electrically coupled to the microcontroller and further communicatively coupled to a mobile device. The microcontroller is further programmed with instructions to communicatively couple the mobile device to the microcontroller with the Bluetooth communication circuit.

In some embodiments, an attachment housing is joined to the planar beam load cell and further attached to a foot on the reel. Tension from the fishing line is transferred to the reel and the plate. The attachment housing transfers tension from the plate to the planar beam load cell deforming the planar beam load cell.

In some embodiments, an analog-to-digital converter is electrically coupled to the planar beam load cell and the microcontroller. The analog-to-digital converter converts an analog planar beam load cell signal to a digital planar beam load cell signal.

In some embodiments, a first light emitting diode electrically coupled to the microcontroller. The microcontroller is further programmed to receive movement data from the accelerometer that the accelerometer is moving. Then, transfer power to the first light emitting diode to indicate that the accelerometer is moving.

In some embodiments, a second light emitting diode electrically coupled to the microcontroller. The microcontroller is further programmed to receive data from the three bank electrically erasable programmable read-only memory as to a first tension value and a second tension value wherein the first tension value is less than the second tension value. Then, receive data from the microcontroller as to an amount of tension on the line.

In some embodiments, an audible alarm electrically coupled to the microcontroller. The microcontroller is further programmed to determine that the amount of tension is greater than the second tension value. Then, engage the second light emitting diode to display a red light. After that, engage the audible alarm.

In some embodiments, the microcontroller is further programmed to determine that the amount of tension is less than the first tension value. Then, engage the second light emitting diode to display a green light.

In some embodiments, the microcontroller is further programmed to determine that the amount of tension is more than the first tension value and less than the second tension value. Then, engage the second light emitting diode to display a yellow light.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
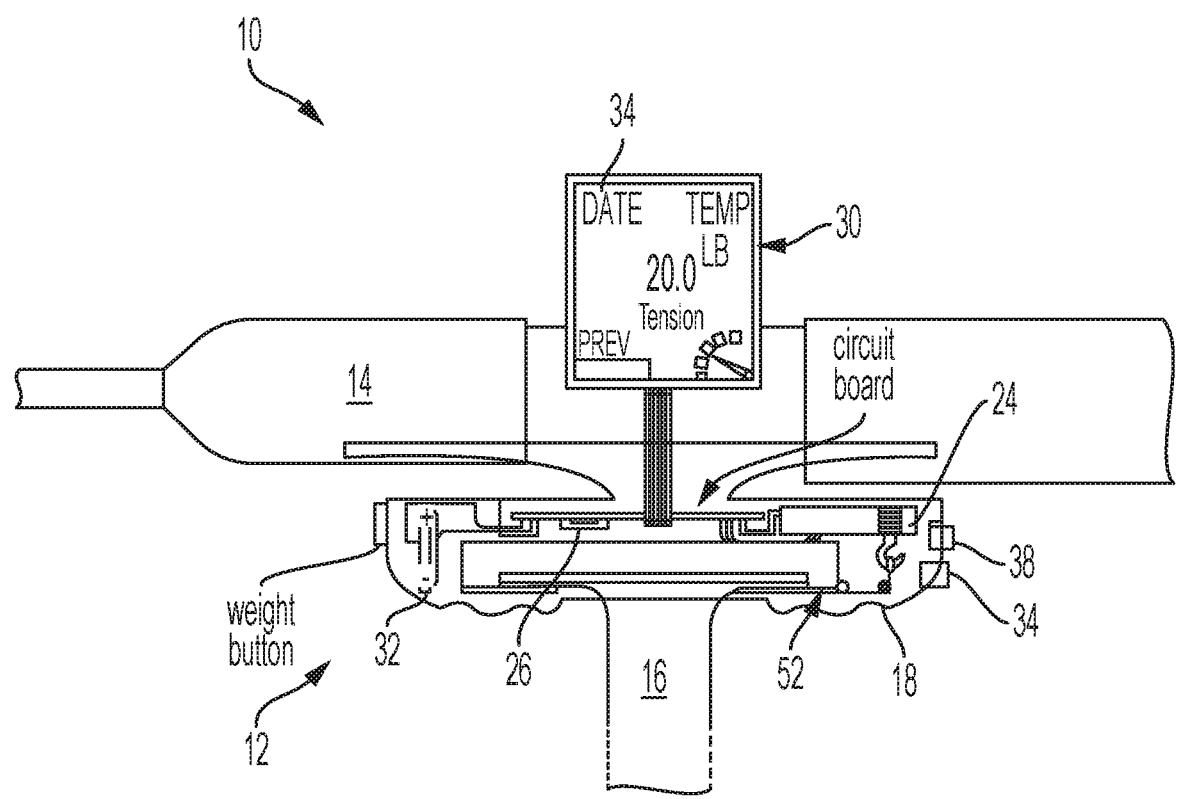
FIG. 1 shows a top section view of one embodiment of the present invention.
Figure 2:
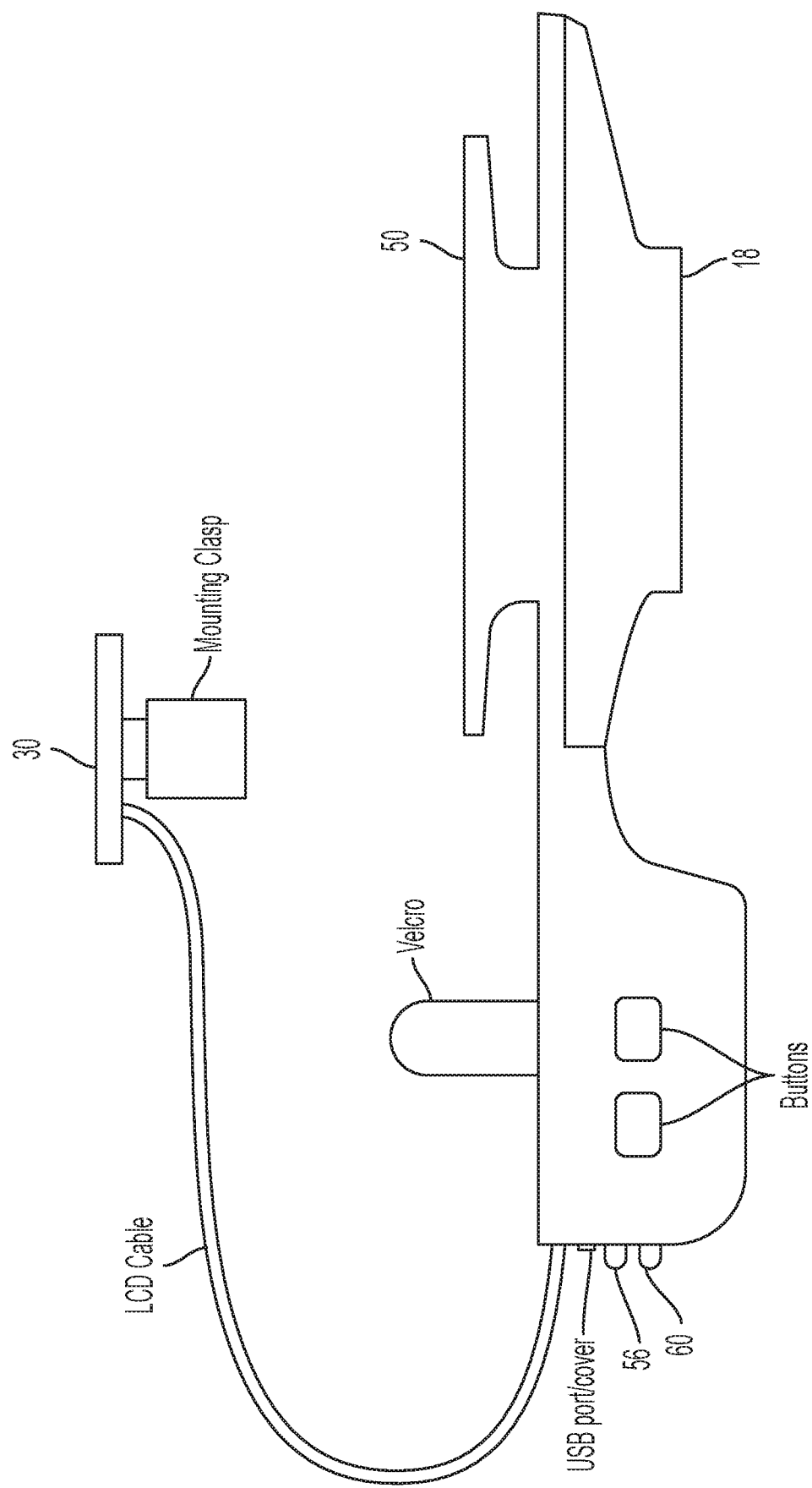
FIG. 2 shows a front view of one embodiment of the present invention.
Figure 3:
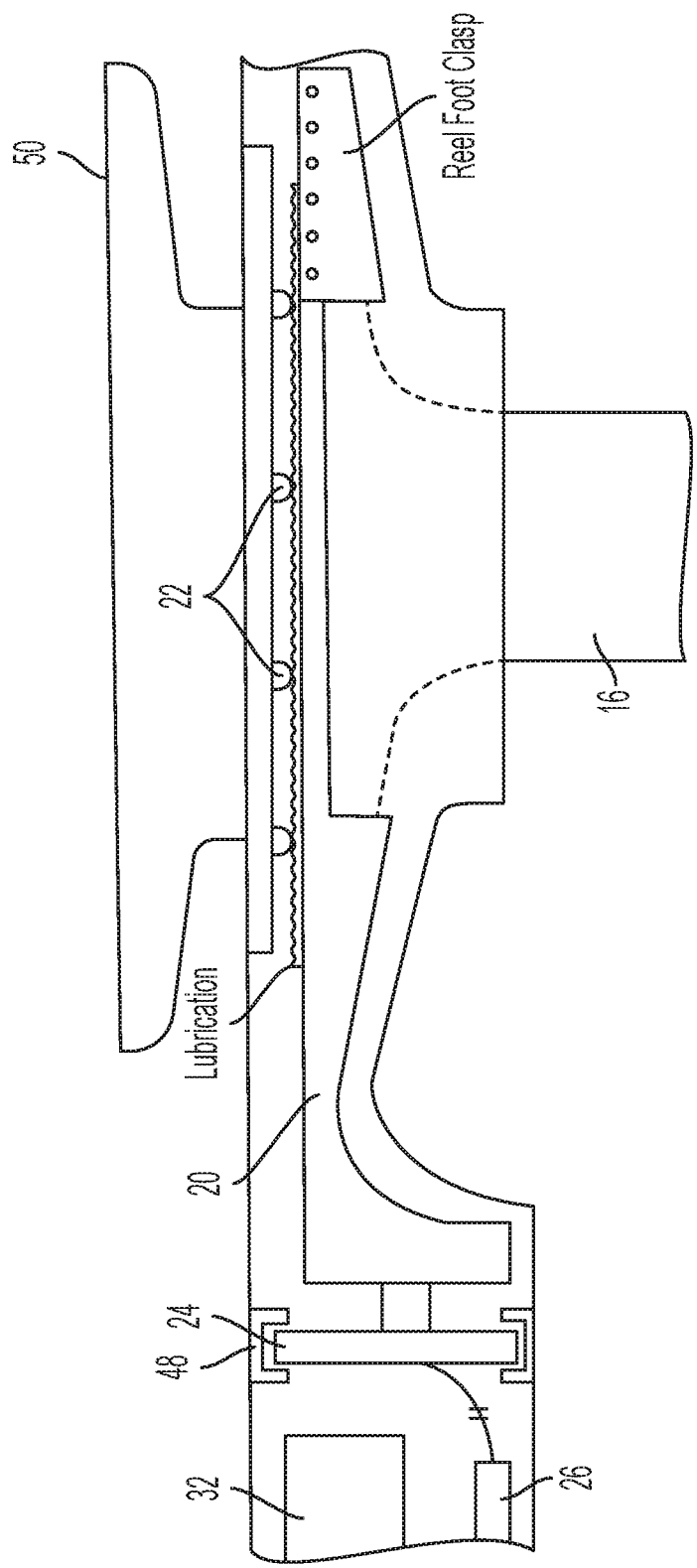
FIG. 3 shows a top section view of one embodiment of the present invention.
Figure 4:
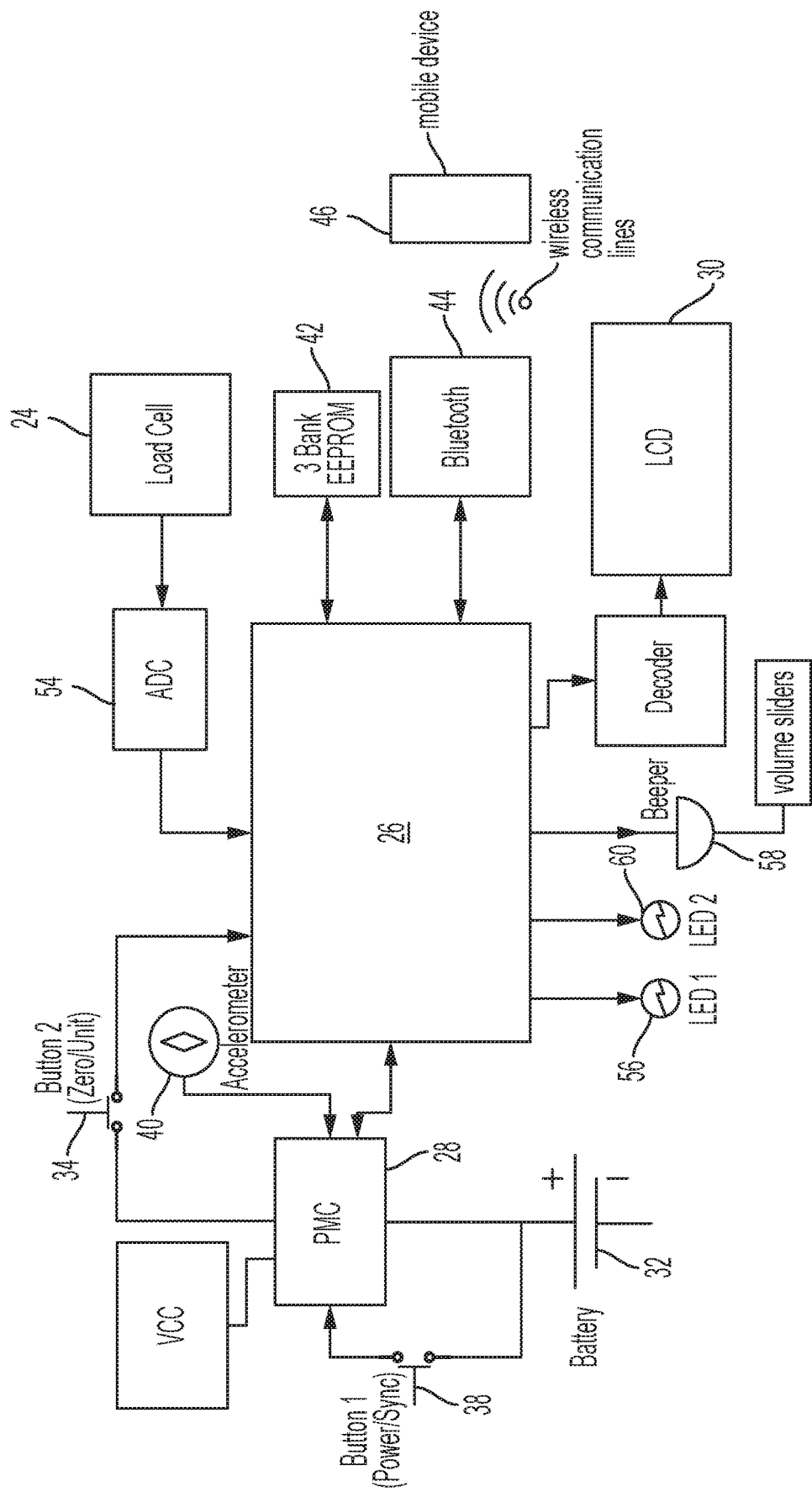
FIG. 4 shows a schematic view of one embodiment of the present invention.
Figure 5:
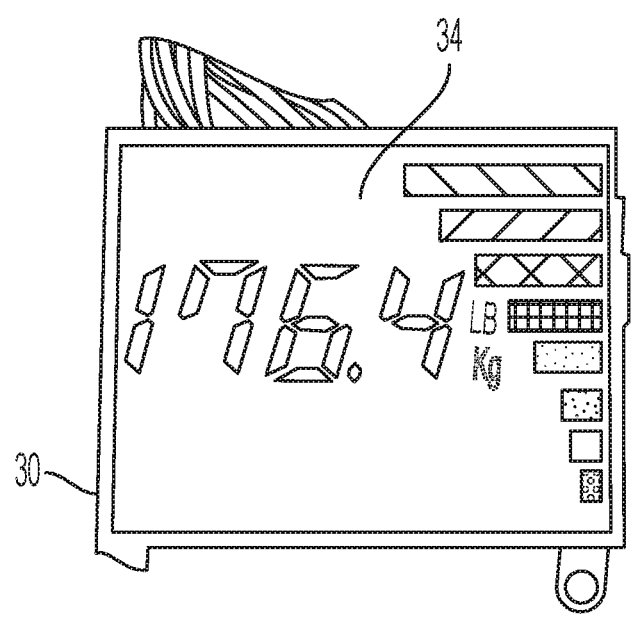
FIG. 5 shows a detail view of one embodiment of the display of the present invention.

By way of example, and referring to FIG. 1, a tension measuring system 10 is configured to determine tension on a fishing line F. The tension measuring system 10 comprises a scale 12, joined between a rod 14 and a reel 16. The reel 16 is joined to the fishing line F.

The scale 12 further comprises a scale housing 18 that is rigidly attached to the rod 14. An internal housing 20 is rigidly attached to the scale housing 18 and connected to the reel 16 with lubricant and ball bearings 22. A planar beam load cell 24 is joined to the scale housing 18 and the reel 16. The tension on the fishing line F causes deformation of the planar beam load cell 24. A microcontroller 26 is electrically coupled to the planar beam load cell 24, a power management controller 28, and a display 30. One example of a microcontroller 26 that can be effective is the CC2540 series of microcontroller sold by Texas Instruments® such as the CC2540F128, or the CC2540F256. Technical specifications for both of these are included in more detail in the file wrapper of this application. One example of a display 30 that can be effective is a customized TN LCD module with White Backlight made by Baize. The planar beam load cell 24 can be a HTC Sensor model TAL109 sensor.

The microcontroller 26 is programmed with instructions to provide electrical power from a battery 32 to the microcontroller 26 with the power management controller 28. Then, determine the deformation of the planar beam load cell 24. After that, convert the deformation of the planar beam load cell 24 into a tension force. Following that, communicate the tension force to the display 30. Then, display a readout 34 of the tension on the display 30.

In some embodiments, a zero button 36 is attached to the scale housing 18 and electrically coupled to the microcontroller 26. The microcontroller 26 is further programmed with instructions to determine an initial amount of deformation in the planar beam load cell 24 when the zero button 36 is pressed. Then, recalibrate a planar beam load cell 24 setting such that the initial amount of deformation correlates to zero tension.

In some embodiments, a power button 38 is attached to the scale housing 18, and electrically coupled to the microcontroller 26. The microcontroller 26 is further programmed with instructions to determine that power button 38 is pressed. Then, transfer electrical power from the battery 32 to the display 30. After that, display the read out of the tension on the display 30.

In some embodiments, an accelerometer 40 is attached to the scale housing 18 and electrically coupled to the power management controller 28. The power management controller 28 is further programmed with instructions to detect movement of the accelerometer 40. Then, transfer electrical power from the battery 32 to the microcontroller 26.

In some embodiments, a three bank electrically erasable programmable read-only memory 42 (or "EEPROM") is electrically coupled to microcontroller 26, and configured to store the instructions for the microcontroller 26. The EEPROM can be a Microchip Technology 93C66B-I/P device. A copy of related documentation for this device is in the file wrapper.

In some embodiments, a Bluetooth communication circuit 44 is electrically coupled to the microcontroller 26 and further communicatively coupled to a mobile device 46. The microcontroller 26 is further programmed with instructions to communicatively couple the mobile device 46 to the microcontroller 26 with the Bluetooth communication circuit 44. The Bluetooth® communication circuit could be a Nordic Semiconductor nRF8001. A copy of related documentation for this circuit is in the file wrapper.

In some embodiments, an attachment housing 48 is joined to the planar beam load cell 24 and further attached to a foot 50 on the reel 16. Tension from the fishing line F is transferred to the reel 16 and a plate 52. The attachment housing 48 transfers tension from the plate 52 to the planar beam load cell 24 deforming the planar beam load cell 24.

In some embodiments, an analog-to-digital converter 54 is electrically coupled to the planar beam load cell 24 and the microcontroller 26. The analog-to-digital converter 54 converts an analog planar beam load cell signal to a digital planar beam load cell signal. An example of an analog to digital converter 54 is a Microchip technology MCP3002 device. A copy of technical specifications for this is in the file wrapper.

In some embodiments, a first light emitting diode 56 is electrically coupled to the microcontroller 26. The microcontroller 26 is further programmed to receive movement data from the accelerometer 40 that the accelerometer 40 is moving. Then, transfer power to the first light emitting diode 56 to indicate that the accelerometer 40 is moving. The accelerometer 40 can be a NXP Semiconductors MMA8451Q, 3-axis, 14-bit/8-bit digital accelerometer. A copy of a technical specification for this circuit is in the file wrapper.

In some embodiments, a second light emitting diode 60 is electrically coupled to the microcontroller 26. The microcontroller 26 is further programmed to receive data from the three bank electrically erasable programmable read-only memory 42 as to a first tension value and a second tension value wherein the first tension value is less than the second tension value. Then, receive data from the microcontroller 26 as to an amount of tension on the line.

In some embodiments, an audible alarm 58 is electrically coupled to the microcontroller 26. The microcontroller 26 is further programmed to determine that the amount of tension is greater than the second tension value. Then, engage the second light emitting diode 60 to display a red light. After that, engage the audible alarm 58.

In some embodiments, the microcontroller 26 is further programmed to determine that the amount of tension is less than the first tension value. Then, engage the second light emitting diode 60 to display a green light.

In some embodiments, the microcontroller 26 is further programmed to determine that the amount of tension is more than the first tension value and less than the second tension value. Then, engage the second light emitting diode 60 to display a yellow light.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon-Fire®, and Samsung® HomeSync®. Those of skill in the art will also recognize that suitable video game console operating systems include, by way of non-limiting examples, Sony® P53®, Sony® P54®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 6:
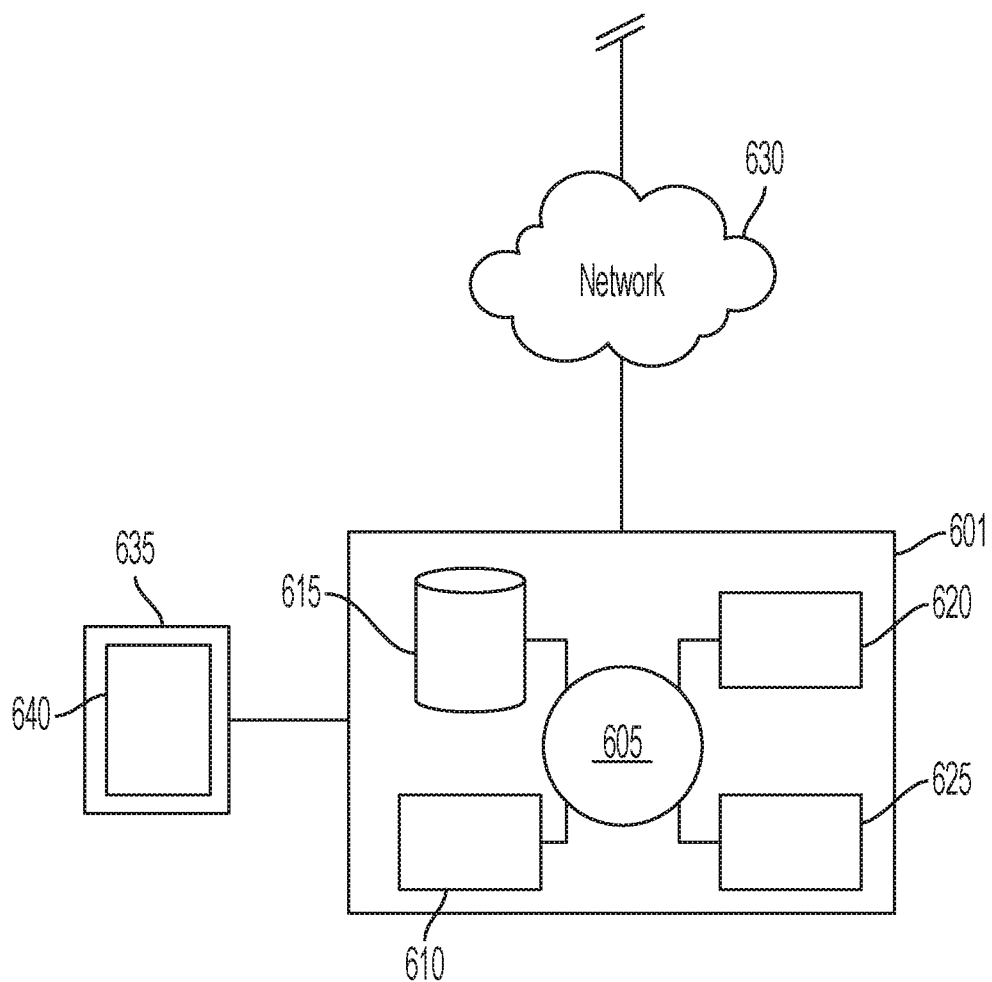
FIG. 6 shows a schematic view of one embodiment of the present invention.

Referring to FIG. 6, in a particular embodiment, a device digital processing device 601 is programmed or otherwise configured to weigh and release an item. The device digital processing device 601 is programmed or otherwise configured to weigh and release an item. In this embodiment, the device digital processing device 601 includes a central processing unit (CPU, also "processor" and "computer processor" herein) 605, which is optionally a single core, a multi core processor, or a plurality of processors for parallel processing. The device digital processing device 601 also includes memory 610 or a memory location (e.g., random-access memory, read-only memory, flash memory), electronic storage unit 615 (e.g., hard disk), communication interface 620 (e.g., network adapter) for communicating with one or more other systems, and peripheral devices 66, such as cache, other memory, data storage and/or electronic display adapters. The memory 610, electronic storage unit 615, communication interface 620 and peripheral devices 66 are in communication with the CPU 605 through a communication bus (solid lines), such as a motherboard. The electronic storage unit 615 comprises a data storage unit (or data repository) for storing data. The device digital processing device 601 is optionally operatively coupled to a computer network ("network") 630 with the aid of the communication interface 620. The network 630, in various cases, is the internet, an internet, and/or extranet, or an intranet and/or extranet that is in communication with the internet. The network 630, in some cases, is a telecommunication and/or data network. The network 630 optionally includes one or more computer servers, which enable distributed computing, such as cloud computing. The network 630, in some cases, with the aid of the device digital processing device 601, implements a peer-to-peer network, which enables devices coupled to the device digital processing device 601 to behave as a client or a server.

Continuing to refer to FIG. 6, the CPU 605 is configured to execute a sequence of machine-readable instructions, embodied in a program, application, and/or software. The instructions are optionally stored in a memory location, such as the memory 610. The instructions are directed to the CPU 605, which subsequently program or otherwise configure the CPU 605 to implement methods of the present disclosure. Examples of operations performed by the CPU 605 include fetch, decode, execute, and write back. The CPU 605 is, in some cases, part of a circuit, such as an integrated circuit. One or more other components of the device digital processing device 601 are optionally included in the circuit. In some cases, the circuit is an application specific integrated circuit (ASIC) or a field programmable gate array (FPGA).

Continuing to refer to FIG. 6, the electronic storage unit 615 optionally stores files, such as drivers, libraries and saved programs. The electronic storage unit 615 optionally stores user data, e.g., user preferences and user programs. The device digital processing device 601, in some cases, includes one or more additional data storage units that are external, such as located on a remote server that is in communication through an intranet or the internet.

Continuing to refer to FIG. 6, the device digital processing device 601 optionally communicates with one or more remote computer systems through the network 630. For instance, the device digital processing device 601 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the device digital processing device 601, such as, for example, on the memory 610 or electronic storage unit 615. The machine executable or machine readable code is optionally provided in the form of software. During use, the code is executed by the cpu 605. In some cases, the code is retrieved from the electronic storage unit 615 and stored on the memory 610 for ready access by the cpu 605. In some situations, the electronic storage unit 615 is precluded, and machine-executable instructions are stored on the memory 610.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 7:
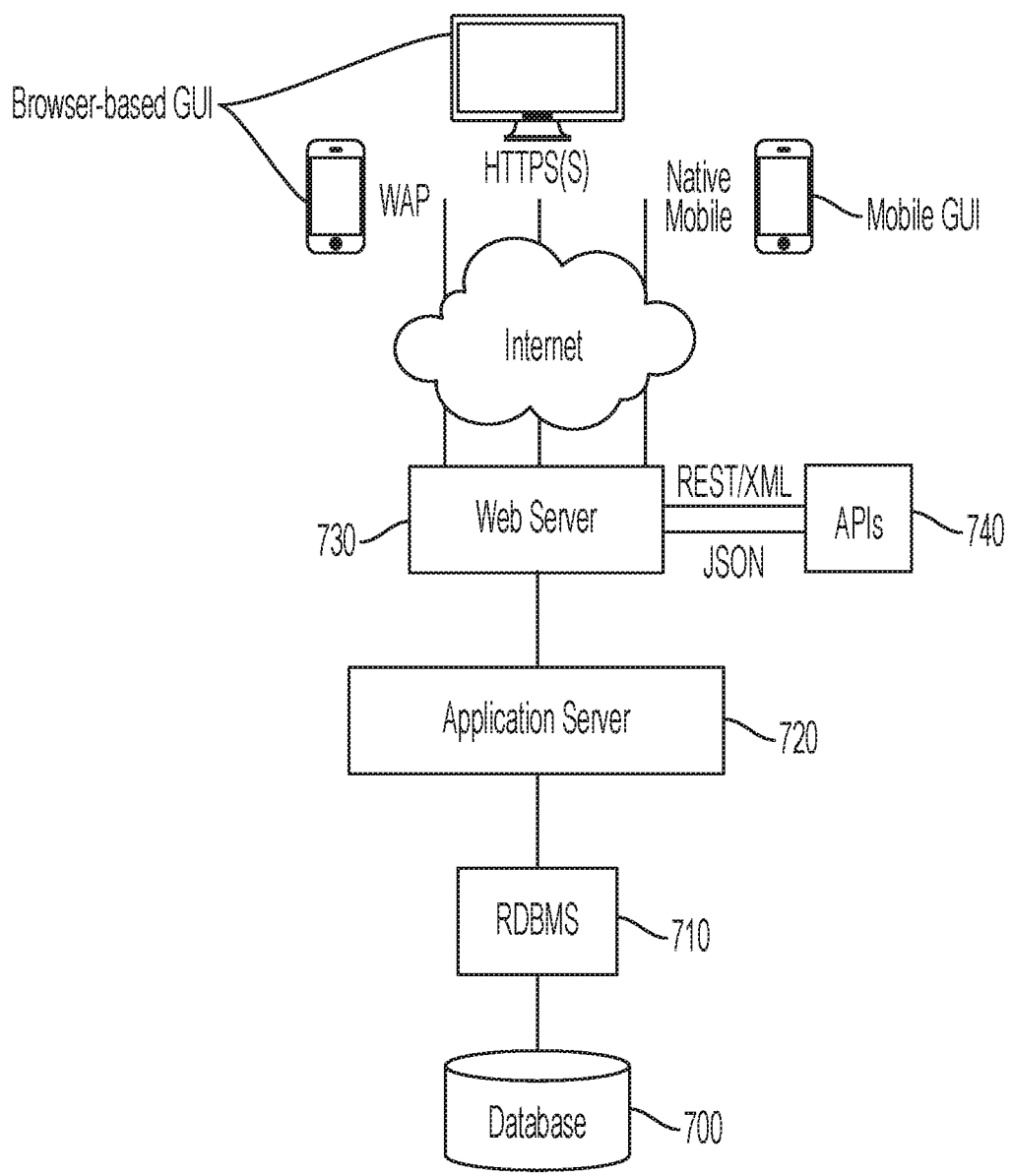
FIG. 7 shows a schematic view of one embodiment of the present invention.

Referring to FIG. 7, in a particular embodiment, an application provision system comprises one or more databases 700 accessed by a relational database management system (RDBMS) 710. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 720 (such as Java servers, .NET servers, PHP servers, and the like) and one or more web servers 730 (such as Apache, IIS, GWS and the like). The web server(s) optionally expose one or more web services via app application programming interfaces (APIs) 740. Via a network, such as the internet, the system provides browser-based and/or mobile native user interfaces.

Figure 8:
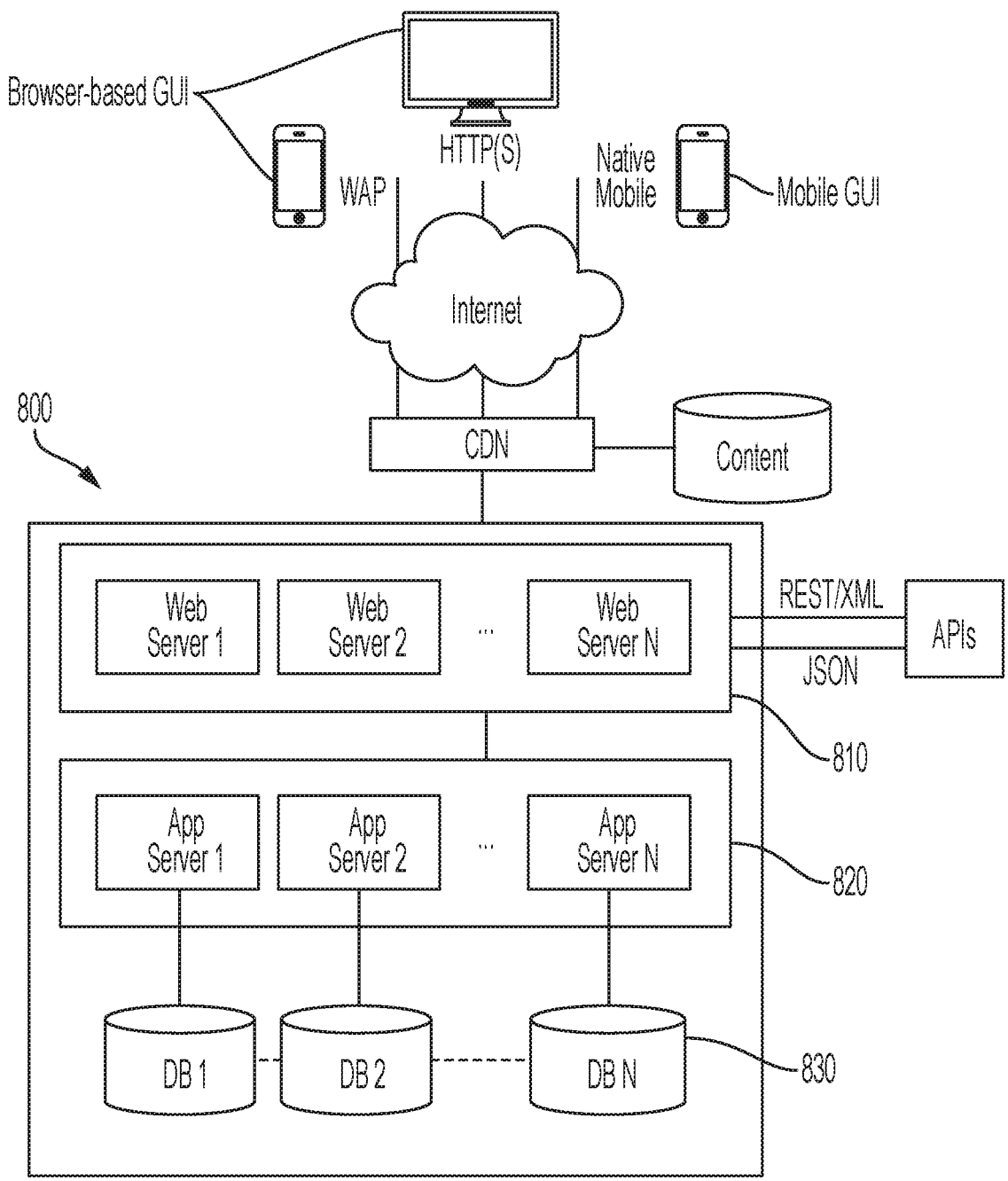
FIG. 8 shows a schematic view of one embodiment of the present invention.

Referring to FIG. 8, in a particular embodiment, an application provision system alternatively has a distributed, cloud-based architecture 800 and comprises elastically load balanced, auto-scaling web server resources 810 and application server resources 820 as well synchronously replicated databases 830.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for weighing and releasing an item. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A tension measuring system, configured to determine tension on a fishing line; the tension measuring system comprising:
    a scale, joined between a rod and a reel; wherein the reel is joined to the fishing line;
    the scale further comprising:
    a scale housing, rigidly attached to the rod;
    an internal housing, rigidly attached to the scale housing with lubricant and ball bearings therebetween;
    a planar beam load cell, joined to the scale housing and the reel; wherein the tension on the fishing line causes deformation of the planar beam load cell;
    a microcontroller, electrically coupled to the planar beam load cell, a power management controller, and a display; wherein the microcontroller is programmed with instructions to:
    provide electrical power from a battery to the microcontroller with the power management controller;
    determine the deformation of the planar beam load cell;
    converting the deformation of the planar beam load cell into a tension force;
    communicating the tension force to the display; and
    displaying a readout of the tension on the display.

2. The tension measuring system of claim 1, further comprising:
    a zero button, attached to the scale housing, electrically coupled to the microcontroller; wherein the microcontroller is further programmed with additional instructions to:
    determine an initial amount of deformation in the planar beam load cell when the zero button is pressed;
    recalibrate a planar beam load cell setting such that the initial amount of deformation correlates to zero tension.

3. The tension measuring system of claim 2, further comprising:
    a power button, attached to the scale housing, and electrically coupled to the microcontroller; wherein the microcontroller is further programmed with further instructions to:
    determine that the power button is pressed;
    transfer electrical power from the battery to the display; and
    display the readout of the tension on the display.

4. The tension measuring system of claim 3, further comprising:
    an accelerometer, attached to the scale housing and electrically coupled to the power management controller; wherein the power management controller is further programmed with power management controller instructions to:
    detect movement of the accelerometer;
    transfer electrical power from the battery to the microcontroller.

5. The tension measuring system of claim 4, further comprising a three bank electrically erasable programmable read-only memory, electrically coupled to the microcontroller, and configured to store the instructions for the microcontroller.

6. The tension measuring system of claim 5, further comprising, a communication circuit, electrically coupled to the microcontroller and further communicatively coupled to a mobile device; wherein the microcontroller is further programmed with more additional instructions to communicatively couple the mobile device to the microcontroller with the communication circuit.

7. The tension measuring system of claim 6; further comprising an attachment housing, joined to the planar beam load cell and further attached to a foot on the reel; wherein the tension from the fishing line is transferred to the reel and a plate; wherein the attachment housing transfers the tension from the plate to the planar beam load cell deforming the planar beam load cell.

8. The tension measuring system of claim 7; further comprising an analog-to-digital converter, electrically coupled to the planar beam load cell and the microcontroller, wherein the analog-to-digital converter converts an analog planar beam load cell signal to a digital planar beam load cell signal.

9. The tension measuring system of claim 7; further comprising a first light emitting diode electrically coupled to the microcontroller; wherein the microcontroller is further programmed to:
  receive movement data from the accelerometer that the accelerometer is moving;
  transfer power to the first light emitting diode to indicate that the accelerometer is moving.

10. The tension measuring system of claim 9; further comprising a second light emitting diode electrically coupled to the microcontroller; wherein the microcontroller is further programmed to:
  receive data from the three bank electrically erasable programmable read-only memory as to a first tension value and a second tension value wherein the first tension value is less than the second tension value; and
  receive data from the microcontroller as to an amount of tension on the fishing line.

11. The tension measuring system of claim 10; further comprising an audible alarm electrically coupled to the microcontroller; wherein the microcontroller is further programmed to:
  determine that the amount of tension is greater than the second tension value;
  engage the second light emitting diode to display a red light; and
  engage the audible alarm.

12. The tension measuring system of claim 10; wherein the microcontroller is further programmed to:
  determine that the amount of tension is less than the first tension value; and
  engage the second light emitting diode to display a green light.

13. The tension measuring system of claim 10; wherein the microcontroller is further programmed to:
  determine that the tension is more than the first tension value and less than the second tension value; and
  engage the second light emitting diode to display a yellow light.

* * * * *